United States Patent
Manea et al.

(10) Patent No.: US 11,412,120 B2
(45) Date of Patent: Aug. 9, 2022

(54) REDUCING A HOLE-IN-ACTIVE-AREA SIZE FOR FLEXIBLE DISPLAYS

(71) Applicant: Google LLC, Mountain View, CA (US)

(72) Inventors: Adrian Manea, Palo Alto, CA (US); Yi Tao, San Jose, CA (US)

(73) Assignee: Google LLC, Mountain View, CA (US)

( * ) Notice: Subject to any disclaimer, the term of this patent is extended or adjusted under 35 U.S.C. 154(b) by 66 days.

(21) Appl. No.: 17/139,465

(22) Filed: Dec. 31, 2020

(65) Prior Publication Data

US 2021/0297563 A1    Sep. 23, 2021

(51) Int. Cl.
*H04N 5/225* (2006.01)
*G06F 1/16* (2006.01)
*H04M 1/02* (2006.01)

(52) U.S. Cl.
CPC ......... *H04N 5/2257* (2013.01); *G06F 1/1652* (2013.01); *G06F 1/1686* (2013.01); *H04M 1/0264* (2013.01); *H04M 1/0268* (2013.01)

(58) Field of Classification Search
CPC ... H04N 5/2257; G06F 1/1652; G06F 1/1686; H04M 1/0264; H04M 1/0268; H04M 1/0214
See application file for complete search history.

(56) References Cited

U.S. PATENT DOCUMENTS

| | | | |
|---|---|---|---|
| 10,068,551 B1 | 9/2018 | Choi et al. | |
| 11,163,970 B1 | 11/2021 | Sammoura et al. | |
| 2002/0050958 A1 | 5/2002 | Matthies et al. | |
| 2010/0207860 A1 | 8/2010 | Chang et al. | |
| 2013/0342519 A1 | 12/2013 | Kim et al. | |
| 2014/0292628 A1 | 10/2014 | Park | |
| 2016/0063933 A1 | 3/2016 | Kobayashi et al. | |
| 2016/0078838 A1 | 3/2016 | Huang et al. | |
| 2016/0210923 A1 | 7/2016 | Yoshida et al. | |
| 2017/0004760 A1 | 1/2017 | Jang et al. | |

(Continued)

FOREIGN PATENT DOCUMENTS

| | | |
|---|---|---|
| CN | 111241890 | 6/2020 |
| CN | 111477135 | 7/2020 |

(Continued)

OTHER PUBLICATIONS

"Samsung Galaxy Z Flip: Top Features", Accessed online at: https://www.themobileindian.com/picture-story/samsung-galaxy-z-flip-top-features-1309-14229 on Oct. 20, 2020, Feb. 15, 2020, 6 pages.

(Continued)

*Primary Examiner* — Nelson D. Hernández Hernández
(74) *Attorney, Agent, or Firm* — Colby Nipper PLLC (57) ABSTRACT

Computing devices are described that can reduce a hole-in-active-area (HIAA) size for flexible displays. The computing device may reduce an HIAA size for a camera without using a circular opening, which is often used on smartphones. In particular, the computing device may utilize a non-circular opening (e.g., a pill-shaped HIAA) and include a camera positioned eccentrically within the non-circular opening. In this way, the HIAA size is minimized to increase a size of an active area (e.g., comprising emissive regions) of the flexible display. Furthermore, the reduced HIAA size can reduce electrical circuitry needed within the active area. The flexible displays can include both bendable and rollable displays.

17 Claims, 8 Drawing Sheets

(56) References Cited

U.S. PATENT DOCUMENTS

| | | | |
|---|---|---|---|
| 2017/0062547 A1 | 3/2017 | Mathew et al. | |
| 2017/0092196 A1 | 3/2017 | Gupta et al. | |
| 2017/0287992 A1 | 10/2017 | Kwak et al. | |
| 2018/0277051 A1 | 9/2018 | Du | |
| 2019/0180691 A1 | 6/2019 | Takasugi | |
| 2019/0228740 A1 | 7/2019 | Aflatooni et al. | |
| 2020/0273427 A1 | 8/2020 | Wang | |
| 2020/0273919 A1 | 8/2020 | Ding et al. | |
| 2021/0192984 A1* | 6/2021 | Yoo | H04M 1/0268 |
| 2021/0201731 A1 | 7/2021 | Ranjan et al. | |
| 2021/0408140 A1 | 12/2021 | Han et al. | |
| 2022/0103672 A1* | 3/2022 | Jung | H04M 1/0216 |

FOREIGN PATENT DOCUMENTS

| | | | |
|---|---|---|---|
| CN | 111739414 A | * | 10/2020 |
| CN | 112331145 | | 2/2021 |
| KR | 20060124209 | | 12/2006 |
| KR | 20120120098 | | 11/2012 |
| WO | 2020156309 | | 8/2020 |
| WO | 2020215878 | | 10/2020 |

OTHER PUBLICATIONS

Choi, et al., "Readability Enhancements for Device Displays used in BrightReadability Enhancements for Device Displays used in BrightLighting Conditions", Dec. 10, 2020, 9 pages.

Iorga, "Huawei Mate X2 5G Gets Rendered and Looks a Lot Like the Galaxy Z Fold 2 5G", Accessed online at: https://tablet-news.com/huawei-mate-x2-5g-gets-rendered-and-looks-a-lot-like-the-galaxy-z-fold-2-5g/on Oct. 20, 2020, Oct. 13, 2020, 3 pages.

Subramaniam, "LG Patents a True Bezel-Less Smartphone Display with an In-Display Selfie Camera", Accessed online at: https://www.notebookcheck.net/LG-patents-a-true-bezel-less-smartphone-display-with-an-in-display-selfie-camera.357626.0.html on Oct. 20, 2020, Nov. 7, 2018, 4 pages.

Choi, "Deposition of Black Material on Metal Traces Surrounding Display Deposition of Black Material on Metal Traces Surrounding Display Screen Blind-Holes to Increase Camera Performance and Improve Screen Blind-Holes to Increase Camera Performance and Improve Ae", Technical Disclosure Commons—https://www.tdcommons.org/dpubs_series/4321, May 25, 2021, 10 pages.

Choi, et al., "Dynamically Altering Clock Signal Frequencies in LTPO AMOLED Displays", Technical Disclosure Commons, https://www.tdcommons.org/dpubs_series/4652, Oct. 12, 2021, 11 pages.

Choi, et al., "Expediting Fingerprint Authentication by Compensating for Display Luminance Latency", Technical Disclosure Commons, https://www.tdcommons.org/dpubs_series/4686, Oct. 29, 2021, 11 pages.

Yonebayashi, et al., "High refresh rate and low power consumption AMOLED panel using top-gate n-oxide and p-LTPS TFTs", Mar. 2020, 10 pages.

Choi, "Clock Trace Structure for Block Sequential Clock Driving", Technical Disclosure Commons, https://www.tdcommons.org/dpubs_series/4786, Dec. 19, 2021, 11 pages.

Wen, et al., "Improving Under-Display Fingerprint Authentication Latency by Normalizing Frame Luminance", Technical Disclosure Commons—https://www.tdcommons.org/dpubs_series/5006, Mar. 24, 2022, 12 pages.

* cited by examiner

REDUCING A HOLE-IN-ACTIVE-AREA SIZE FOR FLEXIBLE DISPLAYS

BACKGROUND

Cameras are commonly included in hand-held computing devices, such as smartphones, to capture images. The portable design of a smartphone enables users to record images while traveling, which has dramatically increased the number of images captured by users throughout most of the world. The cameras included with these mobile devices, however, are often positioned within a display of the smartphone. In situations where a flexible display is used, there are corresponding challenges with cameras that are within or partly within these displays. These challenges can include design of components to increase an area on the flexible display (e.g., an active area) for viewing content (e.g., images, videos, text) and reduction of circuitry within the active area.

SUMMARY

Computing devices are described that include a reduced-size hole-in-active-area (HIAA) for flexible displays. The reduced-size HIAA permits greater active screen area through use of a non-circular opening, such as a pill-shaped HIAA. Further, the camera can be positioned eccentrically within the non-circular opening. In this way, the HIAA size is reduced to increase a size of an active area (e.g., comprising emissive regions) of the flexible display, which improves a user's experience in using the computing device. Furthermore, the reduced HIAA size can reduce electrical circuitry needed within the active area. The flexible displays can include both bendable and rollable displays.

Aspects described below include a computing device with a reduced hole-in-active-area size for flexible displays. The computing device includes a flexible display having a first surface and a second surface. The flexible display is configured to bend along a bend axis, effective to enable a closed configuration including a first fold along the bend axis and an open configuration including a second fold along the bend axis. The closed configuration comprises the first surface positioned in parallel with and in near contact to the second surface. The open configuration comprises the first surface positioned in parallel with and in a same plane as the second surface. The computing device also includes a non-circular opening positioned at least partially in the flexible display. The non-circular opening comprises a first dimension substantially perpendicular to the bend axis and a second dimension substantially parallel to the bend axis. The first dimension is larger than the second dimension. The computing device additionally includes a camera positioned eccentrically within the non-circular opening. The camera is positioned at a first end of the first dimension when the flexible display is in the closed configuration, and the camera is positioned at a second end of the first dimension when the flexible display is in the open configuration.

BRIEF DESCRIPTION OF DRAWINGS

A computing device with reduced hole-in-active-area size for a flexible display is described with reference to the following drawings. The same numbers are used throughout the drawings to reference like features and components:

FIG. 4-1 illustrates an example position of the camera within the non-circular opening for an open configuration of a computing device that includes an opaque masking layer;

FIG. 4-2 illustrates an example position of the camera within the non-circular opening for a partially open configuration of a computing device that includes an opaque masking layer;

FIG. 4-3 illustrates an example position of the camera within the non-circular opening for a closed configuration of a computing device that includes an opaque masking layer;

DETAILED DESCRIPTION

Overview

New features for displays continue to be developed that facilitate operation or expand capabilities of computing devices for enhancing a user experience. Some new features may include flexible displays (e.g., foldable, rollable) that bend into various configurations. While users may find it advantageous to use these computing devices, there are many challenges associated with the development of flexible displays. These challenges may include designing components to increase an area on the flexible display (e.g., an active area) for viewing content (e.g., images, videos, text), reducing circuitry within the active area, and improving the user experience.

One such challenge includes providing a desirable user experience on a computing device that includes a flexible display. A user may desire a large active area (e.g., comprising emissive regions) on the flexible display to enhance content. However, many conventional computing devices include one or more cameras, such as a large, circular HIAA that reduces a size of the active area. For example, a user may have a large HIAA on the flexible display of their smartphone that reduces a size of the active display and, therefore, the presented content. The user may become burdened by this obstruction because the content is smaller than desired, based on a size of the computing device.

Another challenge with flexible displays having a camera includes the circuitry of the active area. Flexible displays may contain a plurality of conductive lines within the active area that enable electrical operations of the computing device. If the HIAA is at least partially within the flexible display, electrical connections will need to be wired around the HIAA, increasing a border of, and the size of, the HIAA. These additional electrical connections can reduce the size of content viewed by the user on the flexible display.

To address these challenges, this document describes a computing device for reducing a hole-in-active-area for flexible displays. The computing device described herein utilizes a non-circular (e.g., oval, elliptical, or pill-shaped) opening to reduce a size of the HIAA for a camera. The camera is positioned eccentrically within the opening to allow for movement of the flexible display relative to the camera when the computing device is bent into various configurations.

In general, it is common for the flexible display (e.g., substrate layers) to move relative to the position of the camera when the computing device is bent along a bend axis (e.g., opened or closed). Therefore, the size of the HIAA incorporates a full range of motion of the camera relative to the HIAA to avoid a mechanical interaction of the camera with a substrate layer or another component (e.g., a camera hitting a side of the HIAA) of the computing device. If the mechanical interaction were to occur, the computing device could become damaged and/or cease to perform correctly.

Some computing devices, for example, may use a circular opening (e.g., a circular HIAA) to allow the camera to move within the HIAA without mechanical interactions. In this example, the camera may be positioned concentrically within the circular opening when the computing device is open (e.g., open to a full extent) and positioned at one end (e.g., a first end) of the circular opening when the computing device is closed. Therefore, the camera does not make full use of the circular opening (e.g., there is unused space at a second end). This unused space reduces the size of content viewed on the flexible display.

In contrast, the described computing device herein utilizes a non-circular opening to reduce a size of unused space and increase the size of content on the flexible display for user enjoyment. To reduce the size of the unused space, the camera is positioned eccentrically within the non-circular opening. For example, when the computing device is in a closed configuration, the camera is positioned at a first end of the opening. When the computing device is in an open configuration (e.g., open to a full extent), the camera is positioned at a second end of the opening.

In another example, the computing device described herein may reduce circuitry required within the active area of the flexible display. For a computing device that utilizes the non-circular opening, fewer conductive lines are required to be wired around the non-circular opening, reducing a border of the non-circular opening and increasing the size of the active area. By reducing a number of conductive lines in the border, the size of content viewed on the flexible display may increase for user enjoyment.

Example Computing Device

Figure 1:
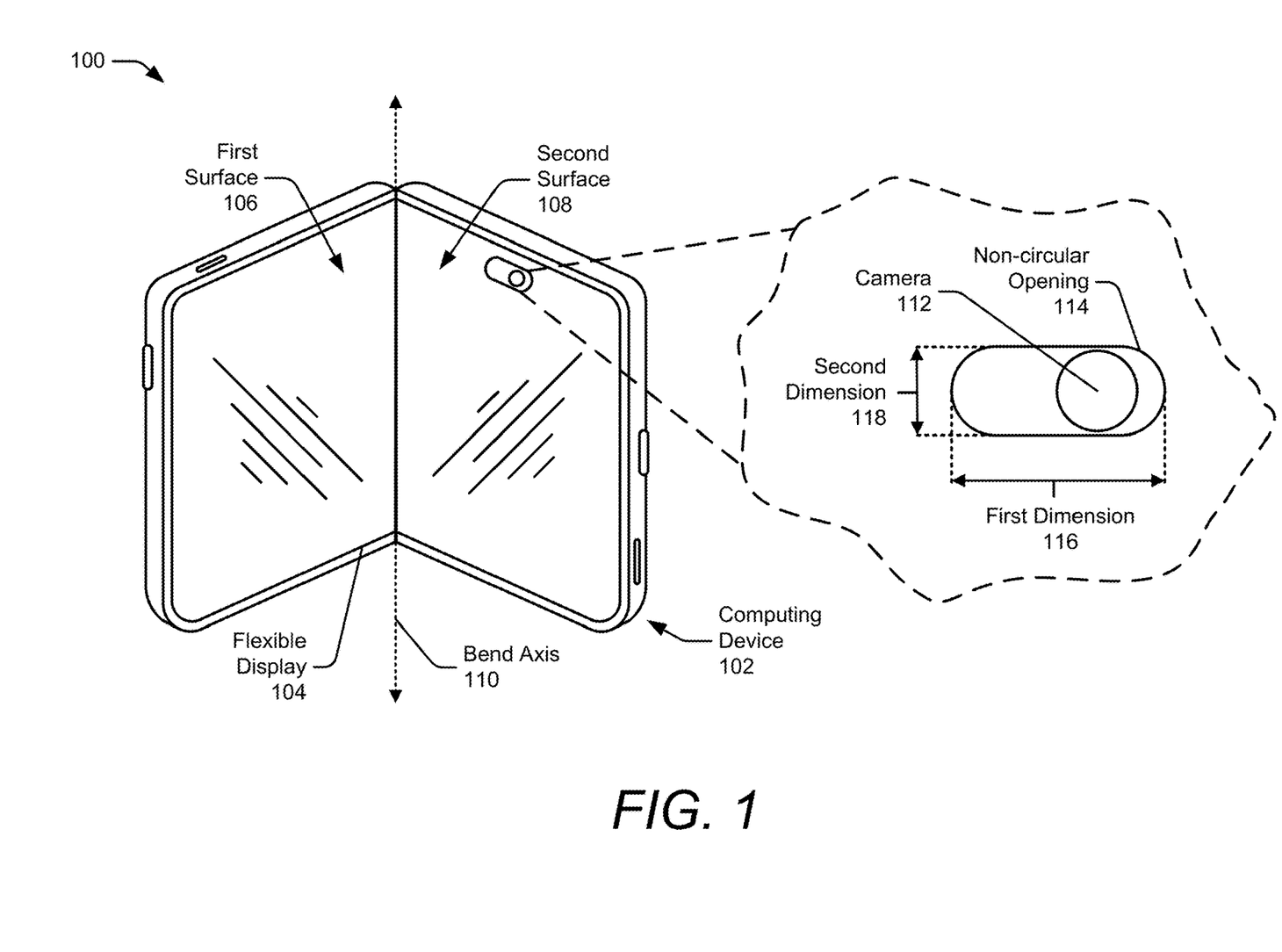
FIG. 1 illustrates an example computing device that includes a flexible display and a non-circular opening for a camera.

FIG. 1 is an illustration of a computing device 102 that includes a flexible display 104 and an HIAA that is reduced in size. While the example computing device 102 described in this publication is a smartphone, other types of computing devices can also support the techniques described. A computing device may include one or more processors, transceivers, a computer-readable medium (CRM), and/or an input/output device (e.g., a flexible display). The computing device may also include one or more components (e.g., a camera).

The flexible display 104 includes a first surface 106 and a second surface 108, separated by a bend axis 110. The flexible display 104 may be bendable or rollable along the bend axis 110. In environment 100, the computing device 102 is bendable about the bend axis 110. The flexible display 104 further includes a camera 112 positioned eccentrically within a non-circular opening 114.

A size of the non-circular opening 114 is reduced to eliminate unused space but allow for movement of the camera 112 relative to the flexible display 104 when the computing device 102 is bent. A shape of the non-circular opening 114 resembles two semicircles connected by a rectangle (here, a pill-shape) and comprises a first dimension 116 (e.g., a horizontal dimension) that is substantially larger than a second dimension 118 (e.g., a vertical dimension).

A size of the second dimension 118 is reduced to minimize unused space but allow for movement of the camera 112 relative to the non-circular opening 114 during a bend of the flexible display 104. The second dimension 118 must be large enough to avoid a mechanical interaction between the camera 112 and the flexible display 104 (e.g., an abrasive or forceful interaction that may damage the computing device 102). The size of the second dimension 118 may include a size of the camera 112 and a tolerance that is defined by mechanical tolerances of the computing device 102 (e.g., alignment error, installation error, fabrication error). A size of the first dimension 116 is also reduced as further described with respect to FIG. 2.

Figure 2:
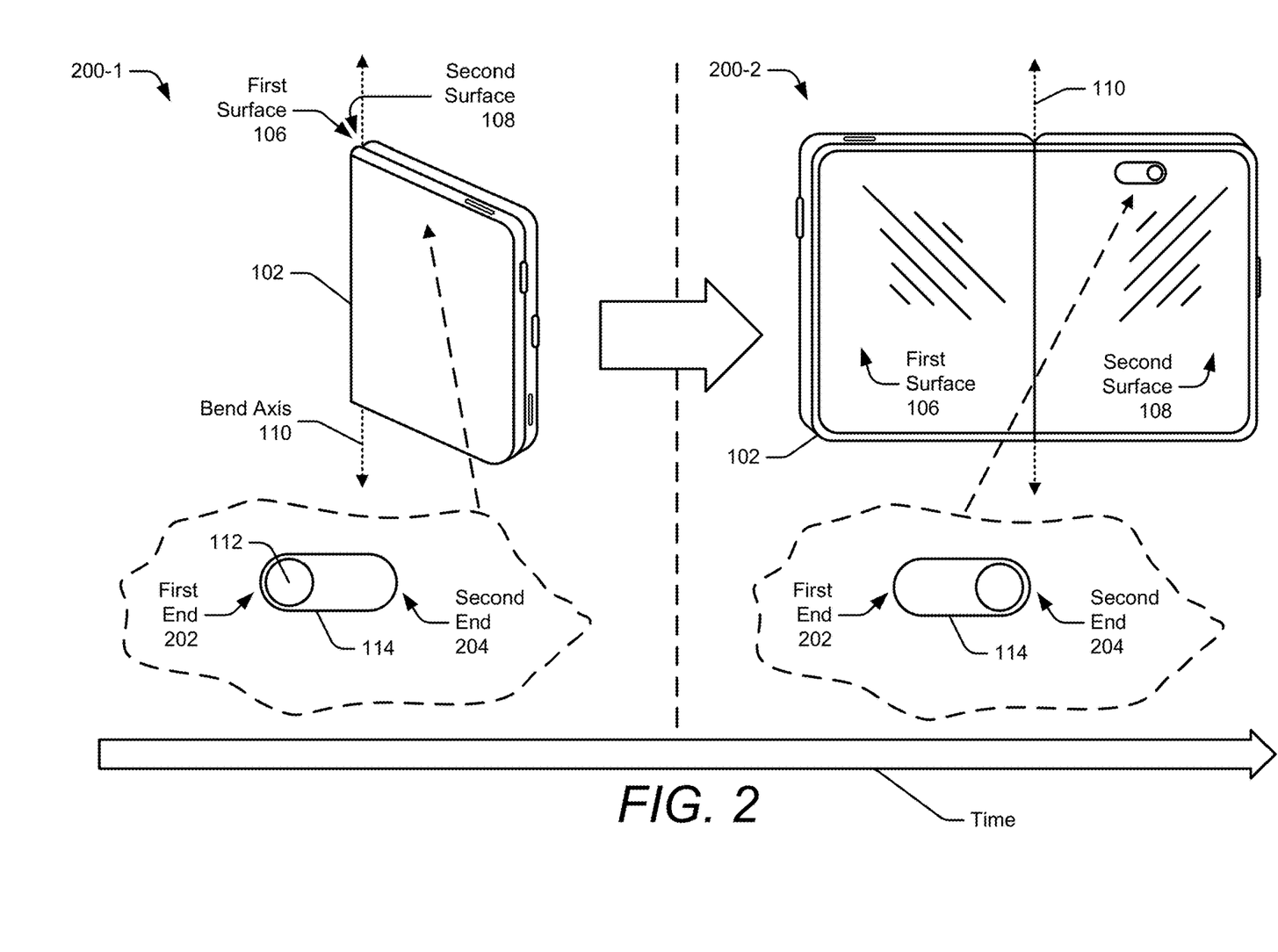
FIG. 2 illustrates an example sequence flow diagram of a position of a camera within the non-circular opening for changing fold configurations of the computing device.

FIG. 2 illustrates a sequence flow diagram, with time progressing from left to right. At 200-1, the computing device 102 is in a closed configuration, including a first fold along the bend axis 110. The first fold includes the first surface 106 and the second surface 108 aligned in parallel and in near contact with (or in contact with) each other. The first surface 106 and the second surface 108 form a zero angle (i.e., angle of 0°) between their surfaces. In the closed configuration, the camera 112 is positioned at a first end 202 of the non-circular opening 114.

At 200-2, the computing device 102 has been opened with a second fold along the bend axis 110 into an open configuration. The second fold includes the first surface 106 and the second surface 108 aligned in parallel within a same plane (not in near contact with each other). The first surface 106 and the second surface 108 form a straight angle (i.e., angle of 180°) between their surfaces. In 200-2, the computing device 102 is fully open, and the camera 112 is positioned at a second end 204 of the non-circular opening 114.

While the example open configuration comprises the straight angle between the first surface 106 and second surface 108, other angles can be formed for the fully open computing device 102 (e.g., angles greater than 180°).

In FIG. 2, the flexible display 104 is depicted with two extreme configurations (e.g., an open and closed configuration). The camera 112 must be positioned within the non-circular opening 114 at both extreme configurations and all configurations in between. For example, if the computing device is partially open (e.g., forming an angle within a range of 0–180° between the first surface 106 and the second surface 108), the camera 112 must still be positioned within the non-circular opening 114 without mechanical interaction with the flexible display 104.

The size of the first dimension 116 is reduced to minimize unused space but allow for movement of the camera 112 relative to the non-circular opening 114 during a bend of the flexible display 104. The first dimension 116 must be large enough to avoid mechanical interaction between the camera 112 and the flexible display 104. Therefore, the size of the first dimension 116 may include the size of the camera 112, a size of the movement of the camera 112, and the tolerance (e.g., defined by mechanical tolerances of the computing device 102) at each end. A cross-sectional view of the first dimension 116 is further described with respect to FIG. 3.

Figure 3:
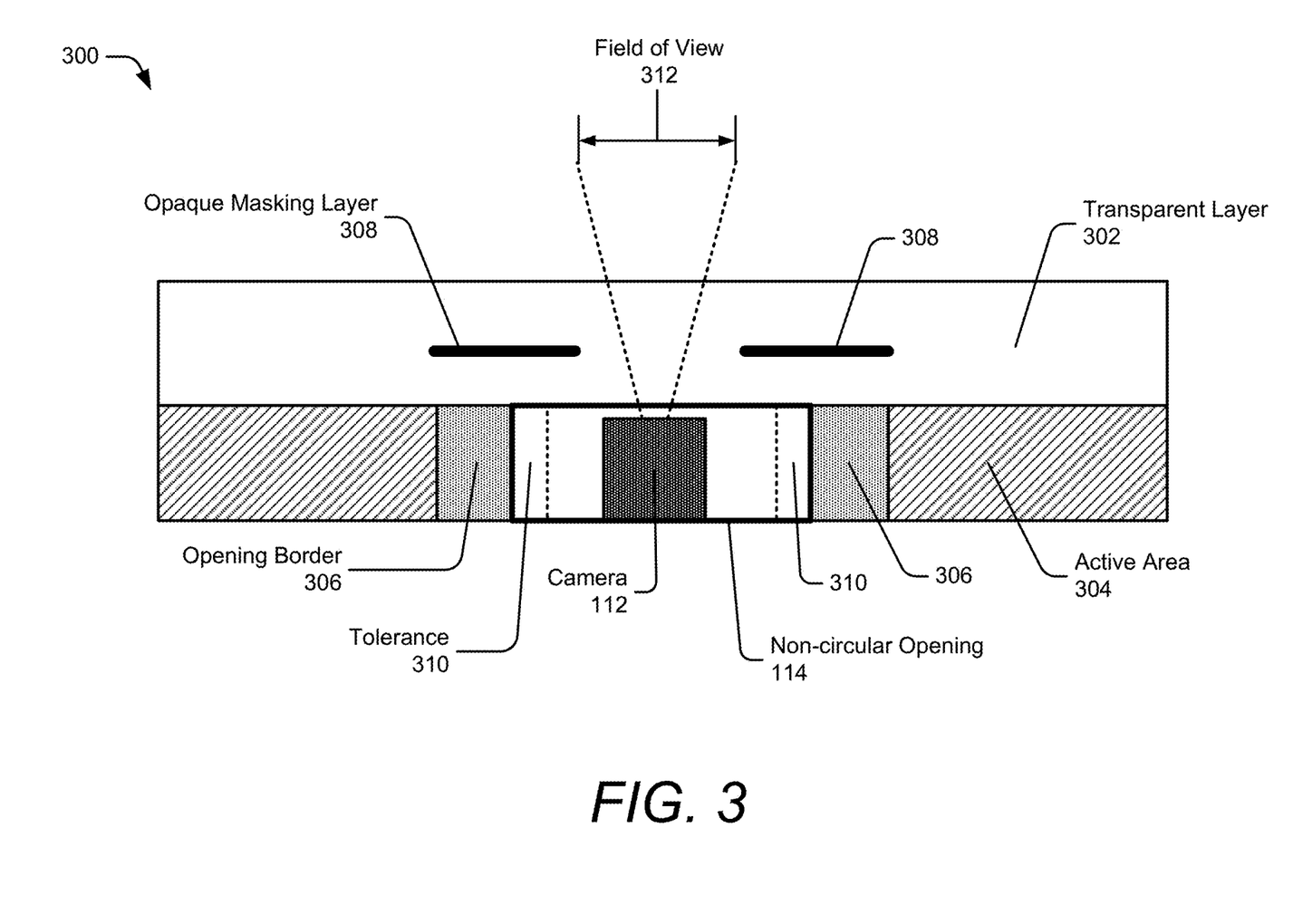
FIG. 3 illustrates an example cross-section of the flexible display.

FIG. 3 illustrates an example cross-sectional view of the computing device 102 along the first dimension 116 of the non-circular opening 114. In environment 300, the flexible display 104 is depicted with two layers (e.g., substrates), including a transparent layer 302 and an active area 304, but is not limited to two layers. The transparent layer 302 may comprise a flexible, transparent material (e.g., optically clear adhesives, optically clear resins, glass, and transparent plastics such as polyimide and polyethylene terephthalate) for protecting one or more layers of the flexible display 104. The active area 304 may include light-emitting elements, one or more organic layers (e.g., emitting layer, emissive layer, an array of organic light-emitting diodes), a cathode, or an anode deposited on the active area 304.

Furthermore, the flexible display 104 may include, for example, an active-matrix organic light-emitting diode (AMOLED) display, organic light-emitting diode (OLED) display modules, light-emitting diode (LED) display modules, liquid crystal display (LCD) display modules, microLED display modules, display technologies with individually controllable pixels, and thin-film technology display modules. The flexible display 104 can include a plurality of conductive lines disposed in the active area 304 to perform operations of the computing device 102 (e.g., display images using pixels).

The non-circular opening 114 depicted in FIG. 3 is positioned at least partially within the active area 304, requiring conductive lines to be wired around the non-circular opening 114. These conductive lines may be positioned within an opening border 306 that is positioned around the non-circular opening 114. A size of the opening border 306 affects the size of the active area 304 and, therefore, the size of content that may be viewed by the user. To increase the size of content for user enjoyment, the size of the opening border 306 may be reduced by minimizing the size of the first dimension 116 and a size of the second dimension 118. By reducing the size of the non-circular opening 114, fewer conductive lines are required in the opening border 306 to perform operations of the computing device 102, thereby reducing obstructions to the active area 304.

The flexible display 104 depicted in environment 300 may also include an opaque masking layer 308 (e.g., a photomask, a shadow-mask) that can block incident light (e.g., from light-emitting diodes, ambient light) using an opaque material (e.g., silicon, metal). In FIG. 3, the example opaque masking layer 308 prevents the user from viewing the opening border 306 and the tolerance 310. The user may desire to operate the camera 112 without occlusion of a field of view 312 by the opaque masking layer 308. To address this desire of the user, the position of the camera 112 relative to the opaque masking layer 308 is further described in FIGS. 4-1, 4-2, and 4-3 for various configurations of the flexible display 104.

Figure 41:
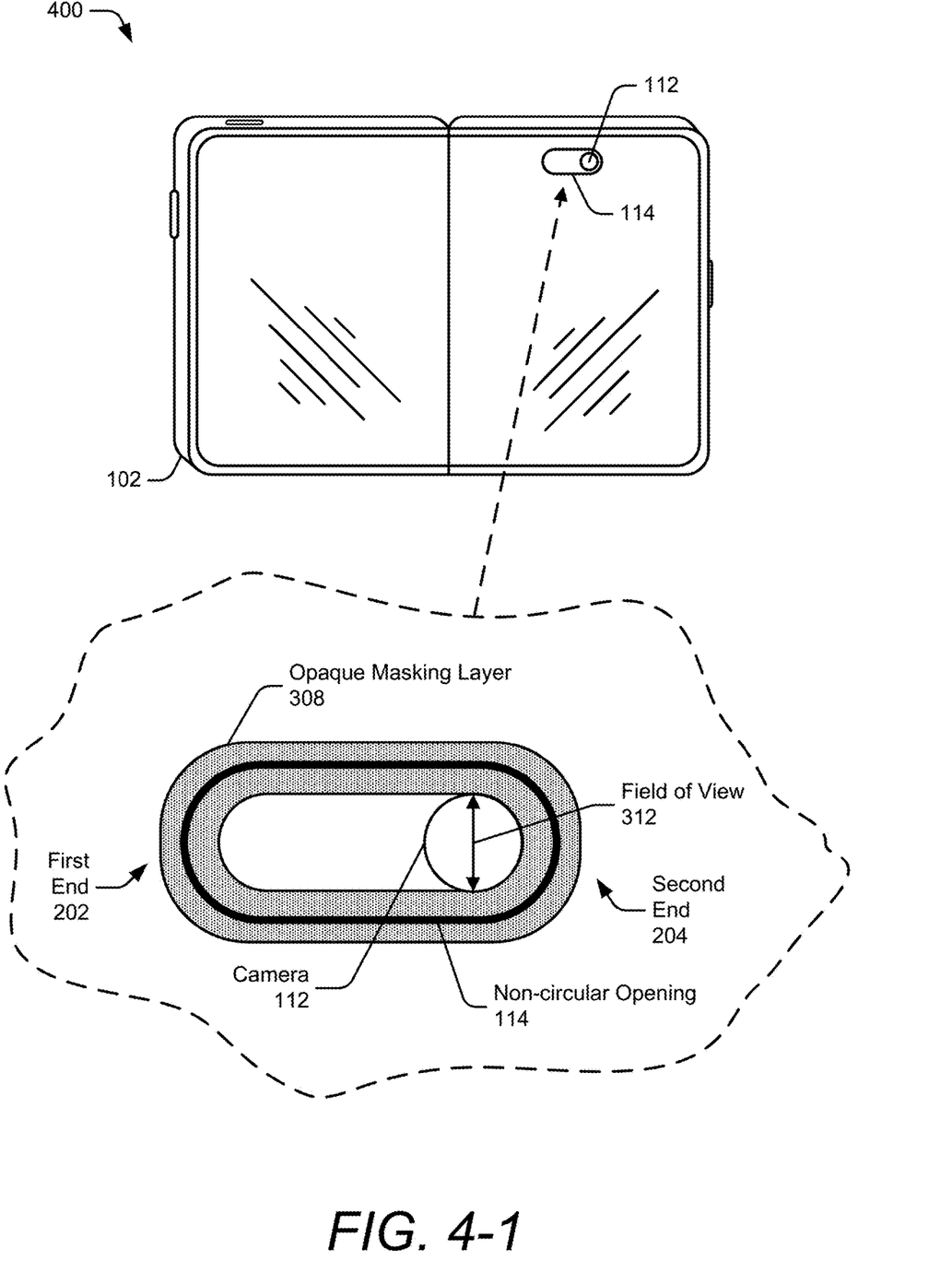

FIG. 4-1 illustrates the position of the camera 112 with respect to the opaque masking layer 308 for the open configuration of the computing device 102. In this configuration, the camera 112 is positioned at the second end 204 of the non-circular opening 114. However, the camera must operate without occlusion of the field of view 312 due to the opaque masking layer 308. Therefore, the camera 112 is positioned as close as possible to the second end 204 without occlusion. It is important for the user to be able to operate the camera 112 with a clear field of view 312 to avoid distortions of content taken with the camera 112 (e.g., photos, videos).

Figure 42:
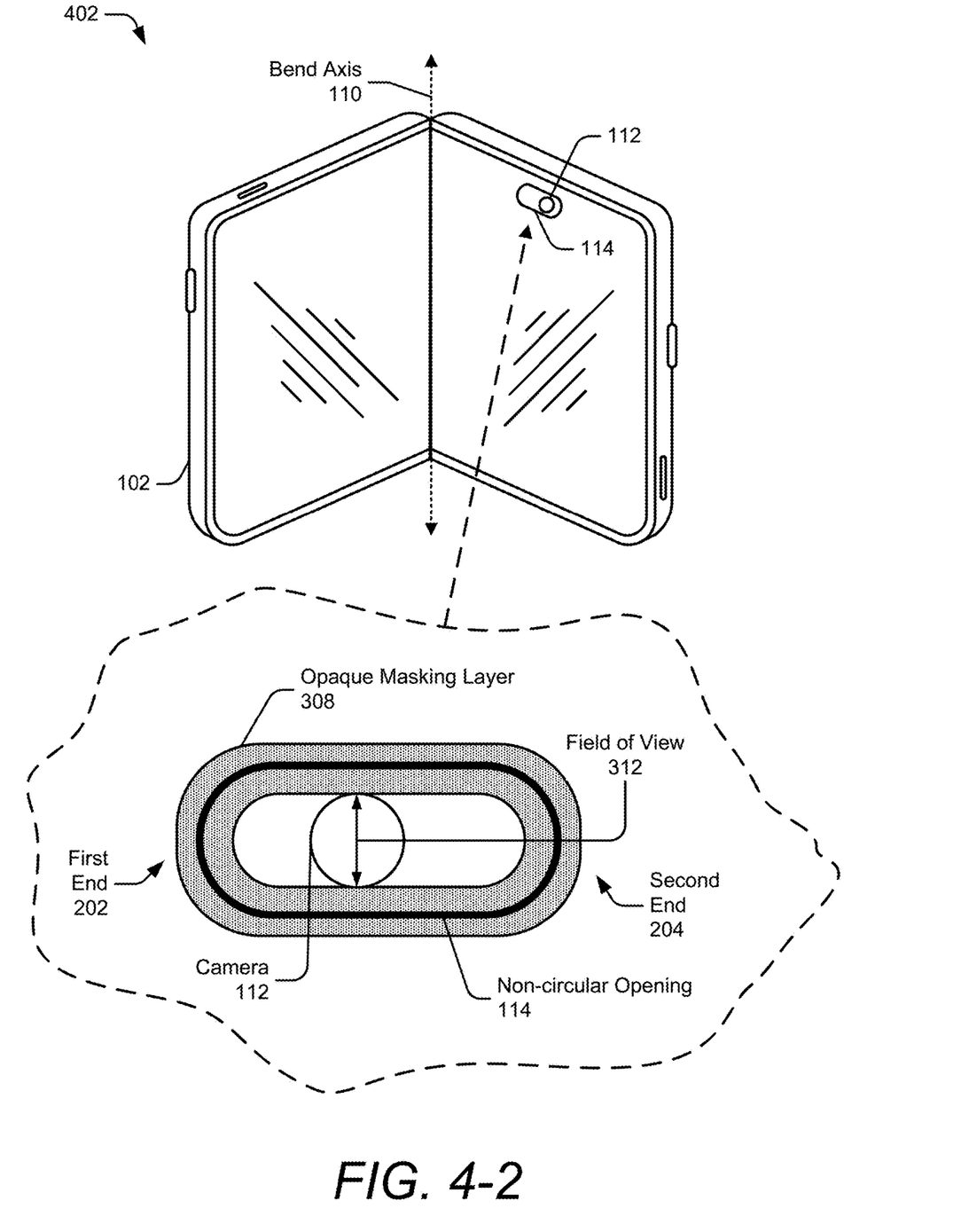

FIG. 4-2 illustrates an example position of the camera 112 with respect to the opaque masking layer 308 for a partially open configuration of the computing device 102, including a third fold along the bend axis 110. The third fold includes the first surface 106 at an angle orthogonal to the second surface 108. The first surface 106 and the second surface 108 form a right angle (i.e., angle of 90°) between their surfaces.

The user may desire to use the camera 112 in this configuration without occlusion from the opaque masking layer 308. In environment 402, the camera is positioned within the non-circular opening 114 without occlusion. While FIG. 4-2 depicts an example position of the camera 112 for the partially open configuration, and the camera 112 may also be positioned in any location within the non-circular opening 114 that does not include occlusion from the opaque masking layer 308. For example, the camera may be positioned as close as possible to the first end 202 without occlusion.

Figure 43:
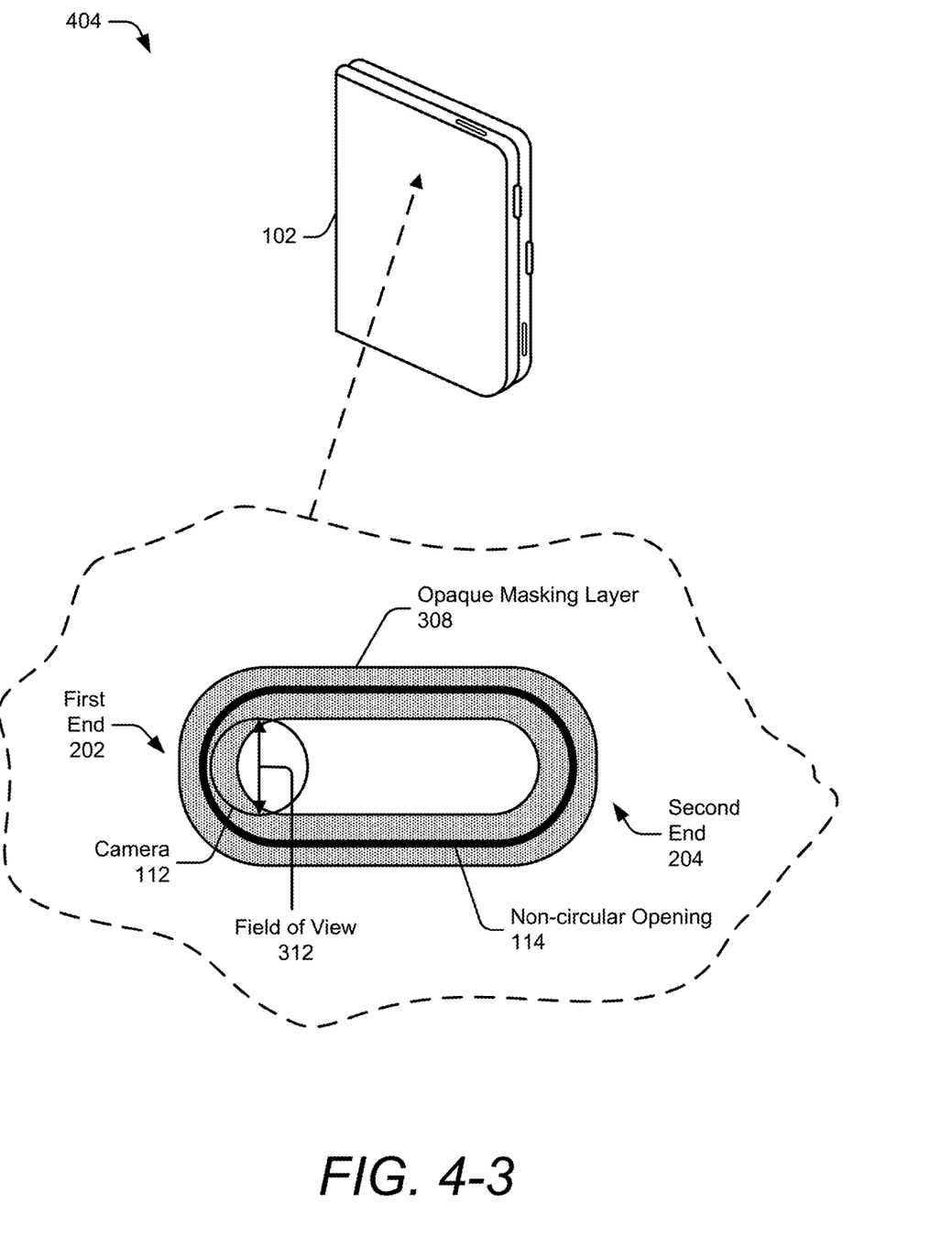

FIG. 4-3 illustrates the position of the camera 112 with respect to the opaque masking layer 308 for the closed configuration of the computing device 102. In this configuration, the camera 112 is positioned at the first end 202 of the non-circular opening 114. The camera 112 cannot be used in a meaningful way in this configuration due to occlusion from the first surface 106. Therefore, the camera 112 may be occluded by the opaque masking layer 308 without diminishing the user experience.

Furthermore, when the first surface 106 and the second surface 108 fold to form acute angles (i.e., angles between 0° and 90°) between their surfaces, the camera 112, for example, may become occluded again by the first surface 106. Since the camera 112 cannot operate in this example without occlusion within a range of folds (e.g., angles between 0° and 90°), the camera 112 may also be occluded by the opaque masking layer 308 without diminishing the user experience.

Figure 5:
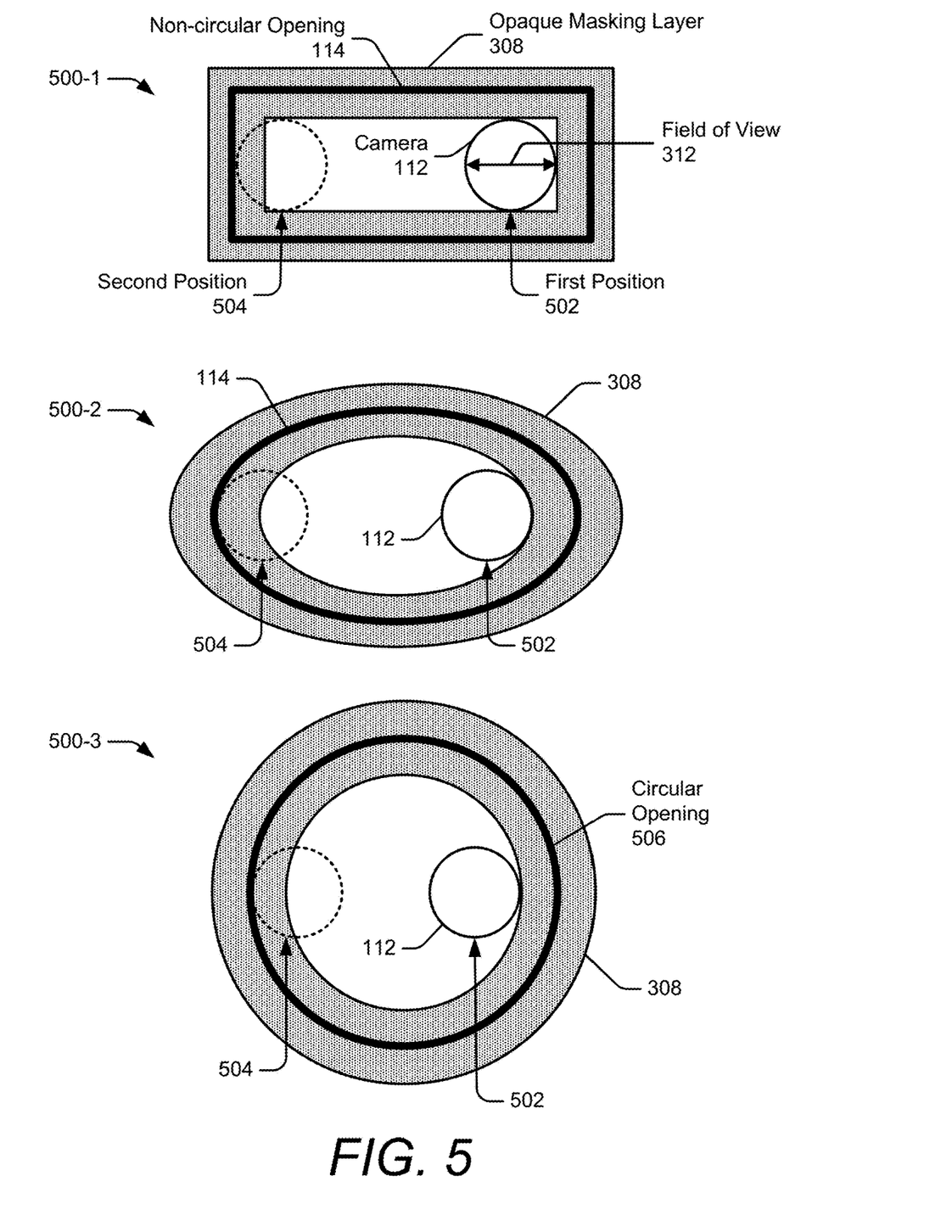
FIG. 5 illustrates example alternative shapes of the non-circular opening.

FIG. 5 illustrates alternative shapes of the non-circular opening 114. The alternative shapes of the non-circular opening 114 can include an oval, an ellipse, a rectangle, a square, and so forth.

The non-circular opening of an alternative shape 500-1 resembles a rectangle in which the camera 112 is located at a first position 502 for an open configuration of the computing device 102 and at a second position 504 for a closed configuration. Also depicted is the non-circular opening of another alternative shape 500-2 which resembles an ellipse. The flexible display 104 may further include a circular opening 506 that is circular in shape as depicted in an alternative shape 500-3. For all alternative shapes 500-1, 500-2, and 500-3, the camera 112 is positioned eccentrically within the non-circular opening 114 and circular opening 506.

As discussed for the non-circular opening 114 of FIGS. 4-1, 4-2, and 4-3, the field of view 312 of the camera 112 of alternative shapes 500-1, 500-2, and 500-3 must not be occluded by the opaque masking layer 308 in both the open configuration and the partially open configuration. However, the field of view 312 may be occluded for the closed configuration in which the camera 112 is in the second position 504. A location of the non-circular opening 114 is further described with respect to FIG. 6.

Figure 6:
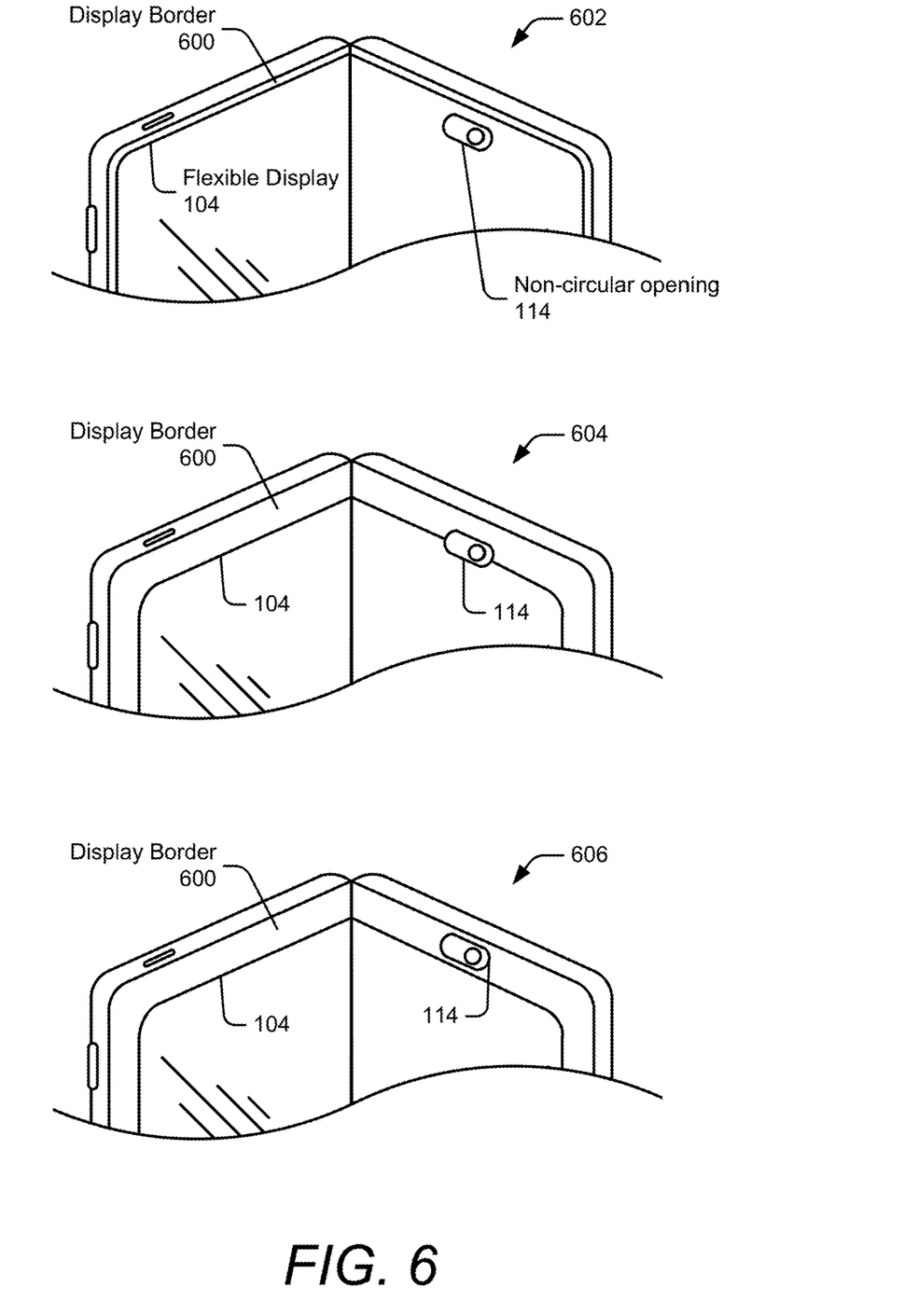
FIG. 6 illustrates example positions of the non-circular opening relative to a display border of the computing device.

FIG. 6 illustrates example locations of the non-circular opening 114 relative to the flexible display 104 and a display border 600. The display border 600 may comprise opaque materials (e.g., plastic, metal) that cover the flexible display 104. The non-circular opening 114 may be located fully within the flexible display 104, as illustrated in environment 602. The non-circular opening 114 may also be located partially within the flexible display 104 and partially within the display border 600, as illustrated in environment 604. The non-circular opening 114 may additionally be located fully within the display border 600, as illustrated in environment 606. In all three example locations, the size of the non-circular opening 114 may affect the size of the active area 304.

CONCLUSION

Although apparatuses including a reduced size of an HIAA with a flexible display have been described in language specific to features, it is to be understood that the subject of the appended claims is not necessarily limited to the specific features described. Rather, the specific features are disclosed as example implementations of a computing device capable of reducing the HIAA size for flexible displays.

Some Examples are described below.

Example 1: A computing device comprising:
a flexible display having a first surface and a second surface, the flexible display configured to bend along a bend axis effective to enable:
a closed configuration including a first fold along the bend axis, the closed configuration comprising the first surface positioned in parallel with and in near contact to the second surface; and
an open configuration including a second fold along the bend axis, the open configuration comprising the first surface positioned in parallel with and in a same plane as the second surface;
a non-circular opening positioned at least partially in the flexible display and comprising:
a first dimension substantially perpendicular to the bend axis; and
a second dimension substantially parallel to the bend axis,
the first dimension larger than the second dimension; and
a camera positioned eccentrically within the non-circular opening, the camera positioned at a first end of the first dimension when the flexible display is in the closed configuration and the camera positioned at a second end of the first dimension when the flexible display is in the open configuration.

Example 2: The computing device of example 1, wherein the flexible display comprises one of the following:
a foldable display configured to bend along the bend axis; or
a rollable display configured to roll along the bend axis.

Example 3: The computing device of example 1, wherein the non-circular opening is characterized by a pill-shape.

Example 4: The computing device of example 1, wherein the flexible display includes a first layer and a second layer positioned in parallel and in contact with each other, the first layer includes a transparent substrate and the second layer includes an active area, the non-circular opening positioned at least partially in the active area.

Example 5: The computing device of example 4, wherein the transparent layer comprises one of the following:
a plastic film; or
a glass substrate.

Example 6: The computing device of examples 4, wherein the non-circular opening is positioned at least partially in the transparent layer.

Example 7: The computing device of example 4, wherein the active area comprises one or more of the following:
an emitting layer;
an emissive layer;
an array of organic light-emitting diodes;
a cathode;
an anode;
a metal touch sensor;
an active-matrix organic light-emitting diode (AMOLED) display;
an organic light-emitting diode (OLED) display;
a light-emitting diode (LED) display;
a liquid crystal display (LCD) display; or
a microLED display.

Example 8: The computing device of example 4, wherein the active area comprises:
a plurality of conductive lines; and
an opening border positioned around the non-circular opening, the opening border configured to route conductive lines around the non-circular opening.

Example 9: The computing device of example 8, wherein a size of the non-circular opening is reduced to enable reduction in a size of the opening border and reduction in the plurality of conductive lines.

Example 10: The computing device of example 9, wherein the first layer further comprises an opaque masking layer configured to cover the opening border and at least partially cover the non-circular opening.

Example 11: The computing device of example 10, wherein the camera is positioned near the second end in the open configuration without occlusion of a field of view of the camera from the opaque masking layer.

Example 12: The computing device of example 10, wherein the camera is positioned at the first end in the closed configuration with or without occlusion of the field of view of the camera from the opaque masking layer.

Example 13: The computing device of example 10, further comprising a partially open configuration including a third fold along the bend axis configured to:
open the first surface at an angle orthogonal to the second surface; and
enable operation of the camera without occlusion of the field of view from the opaque masking layer.

Example 14: The computing device of example 1, further comprising a display border positioned around the flexible display, wherein the non-circular opening is positioned at least partially within the display border.

Example 15: The computing device of example 1, further comprising:
a smartphone;
a laptop computer;
a smart tablet; or
a household appliance.

Example 16: The computing device of example 1, wherein the non-circular opening is characterized by any one of the following shapes:
a rectangle;
a square;
an oval; or
an ellipse.

Example 17: The computing device of example 1, wherein the computing device further comprises:
a circular opening positioned at least partially in the flexible display and comprising the first dimension equal in a size to the second dimension; and
the camera positioned eccentrically within the circular opening, the camera positioned at a first end of the first dimension when the flexible display is in the closed configuration and the camera positioned at a second end of the first dimension when the flexible display is in the open configuration.

The invention claimed is:
1. A computing device comprising:
a flexible display having a first surface and a second surface, the flexible display configured to bend along a bend axis effective to enable:

a closed configuration including a first fold along the bend axis, the closed configuration comprising the first surface positioned in parallel with and in near contact to the second surface; and an open configuration including a second fold along the bend axis, the open configuration comprising the first surface positioned in parallel with and in a same plane as the second surface;

a non-circular opening positioned at least partially in the flexible display and comprising:
  a first dimension substantially perpendicular to the bend axis; and
  a second dimension substantially parallel to the bend axis,
  the first dimension larger than the second dimension; and a camera positioned eccentrically within the non-circular opening, the camera positioned at a first end of the first dimension when the flexible display is in the closed configuration and the camera positioned at a second end of the first dimension when the flexible display is in the open configuration.

2. The computing device of claim 1, wherein the flexible display comprises one of the following:
  a foldable display configured to bend along the bend axis; or
  a rollable display configured to roll along the bend axis.

3. The computing device of claim 1, wherein the non-circular opening is characterized by a pill-shape.

4. The computing device of claim 1, wherein the flexible display further comprises a first layer and a second layer positioned in parallel and in contact with each other, the first layer comprising a transparent layer and the second layer comprising an active area, the non-circular opening positioned at least partially in the active area.

5. The computing device of claim 4, wherein the transparent layer comprises one of the following:
  a plastic film; or
  a glass substrate.

6. The computing device of claim 4, wherein the non-circular opening is positioned at least partially in the transparent layer.

7. The computing device of claim 4, wherein the active area comprises one or more of the following:
  an emitting layer;
  an emissive layer;
  an array of organic light-emitting diodes;
  a cathode;
  an anode;
  a metal touch sensor;
  an active-matrix organic light-emitting diode (AMOLED) display;
  an organic light-emitting diode (OLED) display;
  a light-emitting diode (LED) display;
  a liquid crystal display (LCD) display; or
  a microLED display.

8. The computing device of claim 4, wherein the active area comprises:
  a plurality of conductive lines; and
  an opening border positioned around the non-circular opening, the opening border configured to route conductive lines around the non-circular opening.

9. The computing device of claim 8, wherein a size of the non-circular opening is reduced to enable reduction in a size of the opening border and reduction in the plurality of conductive lines.

10. The computing device of claim 9, wherein the first layer further comprises an opaque masking layer configured to cover the opening border and at least partially cover the non-circular opening.

11. The computing device of claim 10, wherein the camera is positioned near the second end in the open configuration without occlusion of a field of view of the camera from the opaque masking layer.

12. The computing device of claim 10, wherein the camera is positioned at the first end in the closed configuration with or without occlusion of a field of view of the camera from the opaque masking layer.

13. The computing device of claim 10, further comprising a partially open configuration including a third fold along the bend axis configured to:
  open the first surface at an angle orthogonal to the second surface; and
  enable operation of the camera without occlusion of a field of view from the opaque masking layer.

14. The computing device of claim 1, further comprising a display border positioned around the flexible display, wherein the non-circular opening is positioned at least partially within the display border.

15. The computing device of claim 1, further comprising:
  a smartphone;
  a laptop computer;
  a smart tablet; or
  a household appliance.

16. The computing device of claim 1, wherein the non-circular opening is characterized by any one of the following shapes:
  a rectangle;
  a square;
  an oval; or
  an ellipse.

17. The computing device of claim 1, wherein the computing device further comprises:
  a circular opening positioned at least partially in the flexible display and comprising the first dimension equal in a size to the second dimension; and
  the camera positioned eccentrically within the circular opening, the camera positioned at a first end of the first dimension when the flexible display is in the closed configuration and the camera positioned at a second end of the first dimension when the flexible display is in the open configuration.

* * * * *